Sept. 13, 1949.    S. E. W. HOENES    2,482,002
WORK-HOLDER FOR MOUNTING BETWEEN JAWS OF
A VISE TO SUPPORT OR CLAMP A WORKPIECE
Filed March 24, 1945
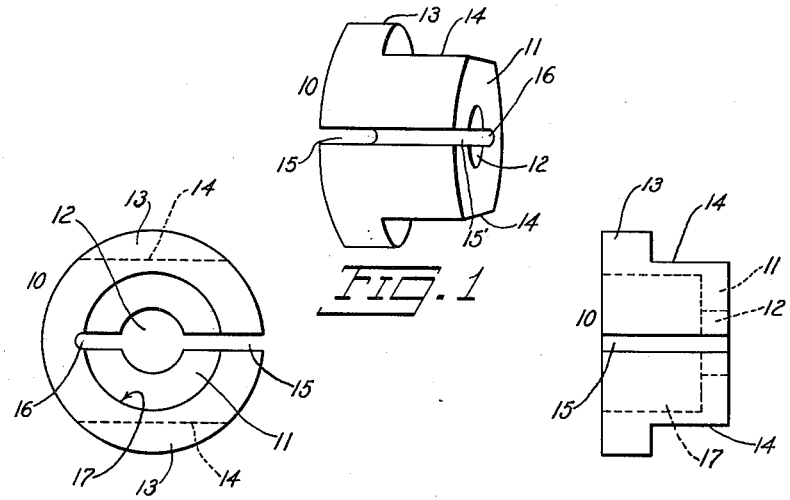
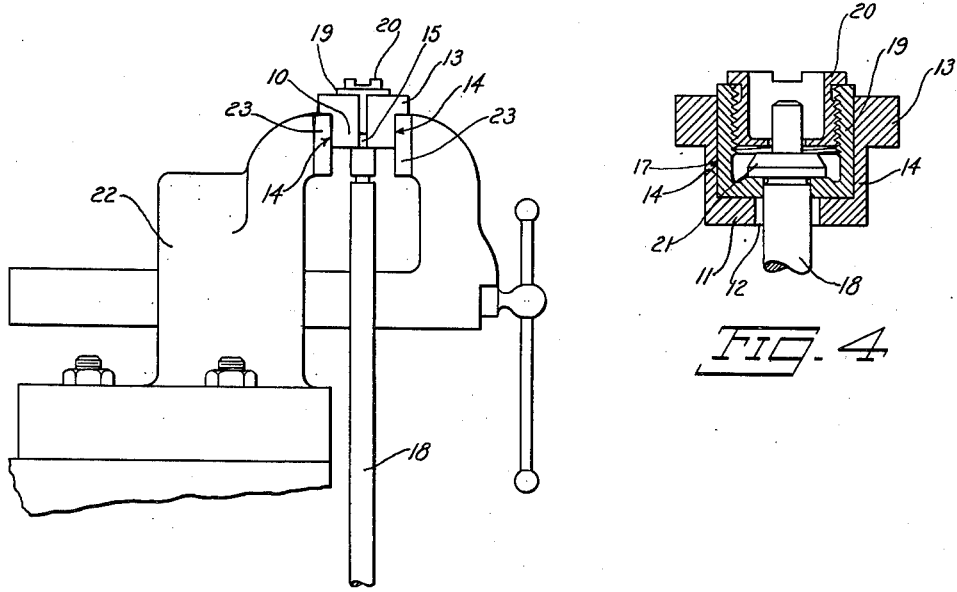
INVENTOR.
Samuel Erwin W. Hoenes
BY Charles S. Wilson
ATTORNEY.

Patented Sept. 13, 1949

2,482,002

UNITED STATES PATENT OFFICE 2,482,002

WORK HOLDER FOR MOUNTING BETWEEN JAWS OF A VISE TO SUPPORT OR CLAMP A WORKPIECE

Samuel Erwin W. Hoenes, East Hempstead, N. Y., assignor to Republic Aviation Corporation, Farmingdale, N. Y., a corporation of Delaware Application March 24, 1945, Serial No. 584,652

2 Claims. (Cl. 81—39)

1

This invention relates to holders designed to be interposed between a work piece and a clamp, vise or other gripping device for the protection of the work piece upon the clamping or gripping engagement thereof.

In short this invention resides particularly in a hollow holder that will contain and support a component of an assembly, such as a piston, while it is clampingly engaged during the adjustment and manipulation of a companion or coacting element, such as a piston rod, the holder including means on its exterior surface to independently support it in a clamping device and also means to provide sufficient resiliency in the holder to permit it to uniformly clamp against the surface of the engaged component when acted on by the clamping device and further means on its interior surface to support the engaged component upon the removal of the pressure of the clamping device.

With the above and other objects in view as will be apparent, this invention consists in the construction, combination and arrangement of parts all as hereinafter more fully described, claimed and illustrated in the accompanying drawings, wherein:

Fig. 1 is a perspective view of a form of the present holder;

Fig. 2 is an end elevation thereof;

Fig. 3 is a side elevation thereof;

Fig. 4 is a vertical section through the holder illustrating the same in cooperation with the piston and piston rod of the compensating valve of the master brake cylinder of an aircraft; and Fig. 5 is an elevation of a vise illustrating the present invention engaging and supporting a piston and rod therein.

In the assembly, adjustment and dismantling of composite structures, as, for example, a piston and its rod, it is customary to clamp or grip one of the components or elements thereof and thereby hold it against movement while the companion or complemental element is manipulated. Since the clamp or vise which holds the engaged element usually comprises two opposed jaws which are moved into clamping engagement with the element, there is an uneven distribution of pressure upon the part being gripped or clamped. This, of course, results in the partial engagement of the element or part and frequently dents, scratches and otherwise mars its surface. In the case of highly polished elements or components, as, for example, the piston and piston rod of the compensating valve of the master brake cylinder of an aircraft, this is particularly undesirable.

2

The present invention proposes a holder which will embrace the parts being assembled, adjusted or dismantled and coact with and cover the entire engaged surface thereof, whereby it is insulated from contact with the clamp or vise. This holder is so constructed that it will cooperate with the jaws of a vise or clamp to receive the pressure thereof transmitting it to and distributing it over the entire engaged surface of the gripped or clamped element.

This prevents any contact between the clamp or vise and the structure operated upon and at the same time supports the same within the vise or clamp prior to the application of any clamping or engaging pressure thereon.

Reference being had more particularly to the drawings, 10 designates the present holder which comprises a hollow or tubular body having one end closed by an end wall 11 provided with a central aperture 12. The opposite or open end of the body 10 is provided with a pair of diametrically opposed flanges 13 which flanges are the result of cutting away the opposed sides of said body to form a pair of flat parallel faces 14 which, when the device is engaged within a clamp or vise, contact with and rest flush against the jaws thereof as will be hereinafter more fully described.

Midway between the flat faces 14 and between the flanges 13 the wall of the body 10 is split longitudinally, as at 15, parallel to the longitudinal axis thereof; the slot 15 thus formed having its sides spaced one from the other. The inner surface of the wall of the body 10 diametrically opposed to the slot 15 is provided with a groove 16 extending throughout the length of the wall and through the end wall 11. As illustrated in the drawing the extension 15' of the slot 15 splits the end wall 11 and terminates at and in communication with the groove 16. Thus the body 10 may be said to be divided by the slots 15—15' into two halves resiliently connected to each other at the groove 16.

The structure above described is preferably made from a single section of metal stock of a diameter substantially equal to the overall diameter of the holder at the flanges 13. The opposed parallel flat surfaces 14 may then be cut therein and the interior bored out to create the inner passage 17 terminating at the end wall 11. The concentric opening 12 in the end wall, the slot 15 and its extension 15', as well as the groove 16, may then be cut into the body by any desired means. The foregoing is merely explanatory of a manner in which the tool may, if desired, be made. It is to be understood, however, that the method of making the same forms no part of the present invention and that the foregoing is merely explanatory.

It is to be observed that the extension 15' of the slot 15, located in the end wall 11, substantially bisects the end wall as well as the opening 12 therein and lies parallel to the opposed parallel flat faces 14 of the device. Thus as above noted, the halves of the body 10, connected at the point of minimum thickness of the wall thereof, may be compressed resiliently by the application of pressure upon the opposed exterior faces 14. In order to distribute the clamping pressure of the holder evenly over the entire outer surface of the engaged element, this relative movement of the halves of the body 10 is necessarily very small. Moreover, due to the groove 16 the material of the body 10 adjacent the groove 16 tends to bow or bend outwardly thus offsetting to a large extent the tendency of the halves of the body 10 to pivot about this portion of the wall, and with the result that the halves of the body, move and remain substantially parallel during the clamping and holding of the engaged element.

In Figs. 4 and 5 is illustrated a use of the present invention. Here a piston 19 and its rod 18 are to be held during the assembly or dismantling thereof by the removal or insertion of the nut 20, threaded into the piston 19 in opposition to the rod 18 to hold a valve 21 in place within the piston. The piston rod 18 is passed through the aperture 12 in the end wall 11 of the tool, while the piston itself is received within the passage or pocket 17 of the hollow body 10 and may project beyond the plane of the outer end of the body 10 as illustrated. With the tool thus positioned upon the work-piece the whole is inserted in the vise 22 with the opposed parallel surfaces 14 of the body in contact with the jaws 23 of the vise, and the opposed flanges 13 resting upon the upper edges of said jaws. Thus the flanges support the present holder and the structure carried by it within the vise prior to and in advance of any gripping or clamping engagement thereof by the jaws 23 of the vise. The jaws 23 are then moved toward one another in the standard manner exerting a uniform clamping or gripping pressure upon the opposed parallel flat faces 14 of the tool 10. This pressure of the jaws 23 causes the opposed sides or halves of the tool created by the slots 15—15' to compress or move toward each other thereby reducing slightly the width of the slot 15—15' and also the inside diameter of the passage or pocket 17. This action of the opposed halves of the tool is assisted by the groove 16 in reducing the thickness of the wall of the holder opposite this slot 15. The movement of the two jaws, thus created in the holder is relatively slight but it distributes the clamping pressure from the jaws 23 of the vise over the entire surface of the piston 19 thereby rigidly engaging it, without a concentration of forces, and holding the piston fixed while the unit is dismantled or assembled by manipulation of the nut 20. The releasing of the pressure on the faces 14 permits the halves of the holder to separate and release the engaged member 19.

While the instant tool has been described in connection with a particular structure, to wit: the piston and rod of a compensating valve of the master brake cylinder of an aircraft, it can, of course, by relatively slight modifications, be applied to other structures and devices.

What is claimed is:

1. A holder comprising a hollow body open at one end and provided with an apertured wall partially closing its opposite end, a pair of opposed, parallel exterior surfaces terminating in spaced relation to the open end of the body, a pair of flanges located above said parallel surfaces and projecting outwardly from the body in opposite directions, said body having an internal longitudinal groove formed in a body wall and extending parallel to and medially between said surfaces, and a longitudinal slot extending entirely through a body wall diametrically opposite said groove to provide spaced faces parallel with said surfaces, said slot extending across and bisecting the aforesaid end wall to terminate in communication with said groove.

2. A unitary holder comprising a hollow, cylindrical body having diametrically opposed portions of its outer surface cut-away to create parallel engaging surfaces and coplanar, outwardly extending flanges at adjacent ends of said surfaces, a wall closing that end of said body opposed to said flanges, said wall being pierced by an opening concentric to the longitudinal axis of the body, a longitudinal slot formed on one end of a diameter of the body between and parallel to said surfaces which also partially bisects the wall on a diameter of, the opening therein, and a groove in said body in opposition to said longitudinal slot.

SAMUEL ERWIN W. HOENES.

REFERENCES CITED

The following references are of record in the file of this patent:

UNITED STATES PATENTS

| Number | Name | Date |
|---|---|---|
| 521,802 | Lutz | June 26, 1894 |
| 839,651 | Sayer | Dec. 25, 1906 |
| 1,311,986 | Miles | Aug. 5, 1919 |
| 1,349,632 | Staley | Aug. 17, 1920 |
| 1,372,665 | Alexander | Mar. 29, 1921 |
| 1,456,365 | Danielson | May 22, 1923 |
| 1,672,808 | Hansel | June 5, 1928 |
| 1,721,111 | Graf | July 16, 1929 |
| 1,724,509 | Nelson | Aug. 13, 1929 |
| 1,895,281 | Currie | Jan. 24, 1933 |
| 2,242,080 | Kurzina | May 13, 1941 |

OTHER REFERENCES

Popular Mechanics, February issue, 1942 (page 118).